United States Patent
Walker

(10) Patent No.: US 7,395,427 B2
(45) Date of Patent: Jul. 1, 2008

(54) AUTHENTICATED KEY EXCHANGE BASED ON PAIRWISE MASTER KEY

(76) Inventor: Jesse R. Walker, 10992 NW. Appellate Way, Portland, OR (US) 97229

( * ) Notice: Subject to any disclaimer, the term of this patent is extended or adjusted under 35 U.S.C. 154(b) by 507 days.

(21) Appl. No.: 10/654,238

(22) Filed: Sep. 2, 2003

(65) Prior Publication Data

US 2005/0032506 A1 Feb. 10, 2005

Related U.S. Application Data

(60) Provisional application No. 60/439,238, filed on Jan. 10, 2003.

(51) Int. Cl.
*H04L 9/00* (2006.01)
*H04M 1/66* (2006.01)
*H04M 1/68* (2006.01)
*H04M 3/16* (2006.01)

(52) U.S. Cl. .................. 713/169; 713/170; 713/171; 455/410; 455/411

(58) Field of Classification Search .............. 455/410, 455/411; 713/168, 169, 170, 171
See application file for complete search history.

(56) References Cited

U.S. PATENT DOCUMENTS

| 5,544,245 A | 8/1996 | Tsubakiyama |
| 2002/0080741 A1 * | 6/2002 | Toyoshima ............... 370/335 |
| 2004/0103282 A1 * | 5/2004 | Meier et al. ............... 713/171 |

* cited by examiner

*Primary Examiner*—George Eng
*Assistant Examiner*—Wesley Kim
(74) *Attorney, Agent, or Firm*—Schwabe, Williamson & Wyatt, P.C.

(57) ABSTRACT

Briefly, in accordance with one embodiment of the invention, a pairwise master key may be utilized to generate nonces for authenticated key exchange during a rekeying event in a wireless local area network.

15 Claims, 3 Drawing Sheets

| COMMUNICATION | INFORMATION TRANSFERRED |
|---|---|
| AP → STA (PROBE RESPONSE) | ANONCE |
| STA → AP (REASSOCIATE REQUEST) | ANONCE, SNONCE, MIC1 |
| AP → STA (REASSOCIATE RESPONSE) | SNONCE, MIC2 |

| COMMUNICATION | INFORMATION TRANSFERRED |
|---|---|
| AP → STA (PROBE RESPONSE) | ANONCE |
| STA → AP (REASSOCIATE REQUEST) | ANONCE, SNONCE, MIC1 |
| AP → STA (REASSOCIATE RESPONSE) | SNONCE, MIC2 |

FIG. 2

| Element ID 1 octet | Length 1 octet | Nonce 32 octets |
|---|---|---|

FIG. 3

| Element ID 1 octet | Length 1 octet | Key ID 8 octets | ANonce 32 octets | SNonce 32 octets | MIC 16 octets |
|---|---|---|---|---|---|

FIG. 4

| Element ID 1 octet | Length 1 octet | Key ID 8 octets | GTK Length 1 octet | Wrapped GTK GTK length octets | RSC 6 octets | GNonce 32 octets | MIC 16 octets |
|---|---|---|---|---|---|---|---|

FIG. 5

AUTHENTICATED KEY EXCHANGE BASED ON PAIRWISE MASTER KEY

CROSS-REFERENCE TO RELATED APPLICATION

The present application claims the benefit of U.S. Provisional Application Ser. No. 60/439,238 filed Jan. 10, 2003.

BACKGROUND OF THE INVENTION

Current wireless local area network (WLAN) systems use at least seven message round trips between a user station (STA) and a new access point (AP) to establish communications during roaming. Without utilizing a preauthentication or the like mechanism, the message cost may be even greater, as any authentication scheme secure in a system compliant with an Institute of Electrical and Electronics Engineers (IEEEE) 802.11 environment results in at least two more round trips within an IEEE 802.11 architecture. Insecure operation today already uses the first five messages. Since insecure roaming is perceived as too expensive, adding the final ten or more messages without optimizing the first five messages is unlikely to improve system performance.

Furthermore, in the current IEEE 802.11 architecture such as IEEE 802.11a or IEEE 802.11b, the access point gets no indication of a rogue user station until the eleventh message of the exchange, and an authorized user station does not detect a rogue access point until the twelfth message in the sequence, so that an attacker may be able to spoof all prior messages. Both the user station and the access point invest a large amount of resources, typically 20 or more milliseconds, before it is possible to detect an active attack. Additional performance degradations may occur, for example an attacker may purposely use the sequence to discourage use of the channel.

DESCRIPTION OF THE DRAWING FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 2 is a table of a method for transferring information between an access point and a user station in accordance with one embodiment of the present invention;

FIG. 3 is a diagram of a nonce information element for a probe response in accordance with one embodiment of the present invention;

FIG. 4 is a diagram of a pairwise master key request information element for a reassociate request in accordance with one embodiment of the present invention;

Figure 6:
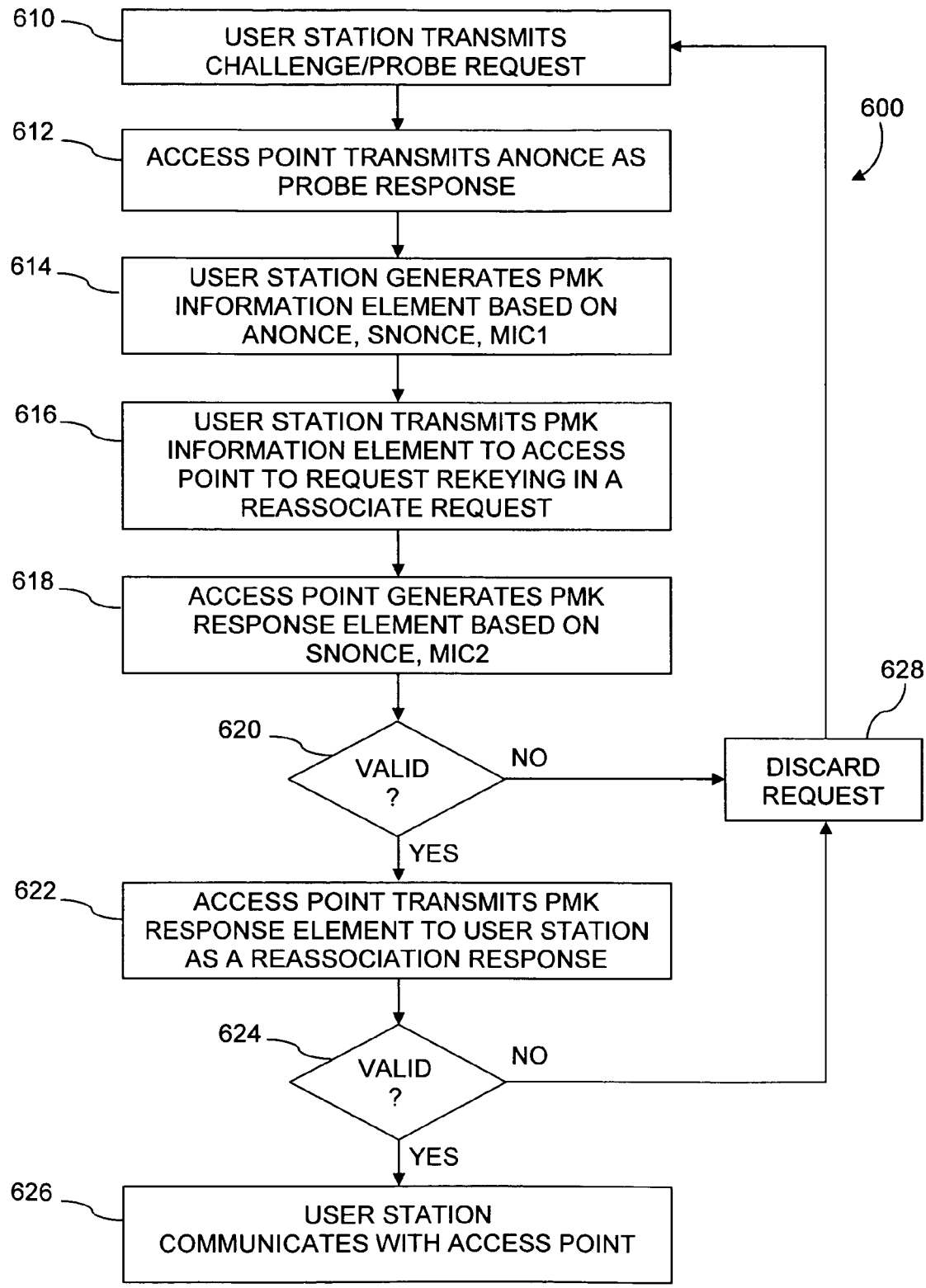

FIG. 5 is a pairwise master key response element of a reassociate response in accordance with one embodiment of the present invention; and FIG. 6 is a flow diagram of a method for an authenticated key exchange in a wireless local area network system in accordance with an embodiment of the present invention It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as processing, computing, calculating, determining, or the like, refer to the action or processes of a computer or computing system, or similar electronic computing device, that manipulate or transform data represented as physical, such as electronic, quantities within the registers or memories of the computing system into other data similarly represented as physical quantities within the memories, registers or other such information storage, transmission or display devices of the computing system.

Embodiments of the present invention may include apparatuses for performing the operations herein. This apparatus may be specially constructed for the desired purposes, or it may comprise a general purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), flash memory, magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms coupled and connected, along with their derivatives, may be used. In particular embodiments, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Figure 1:
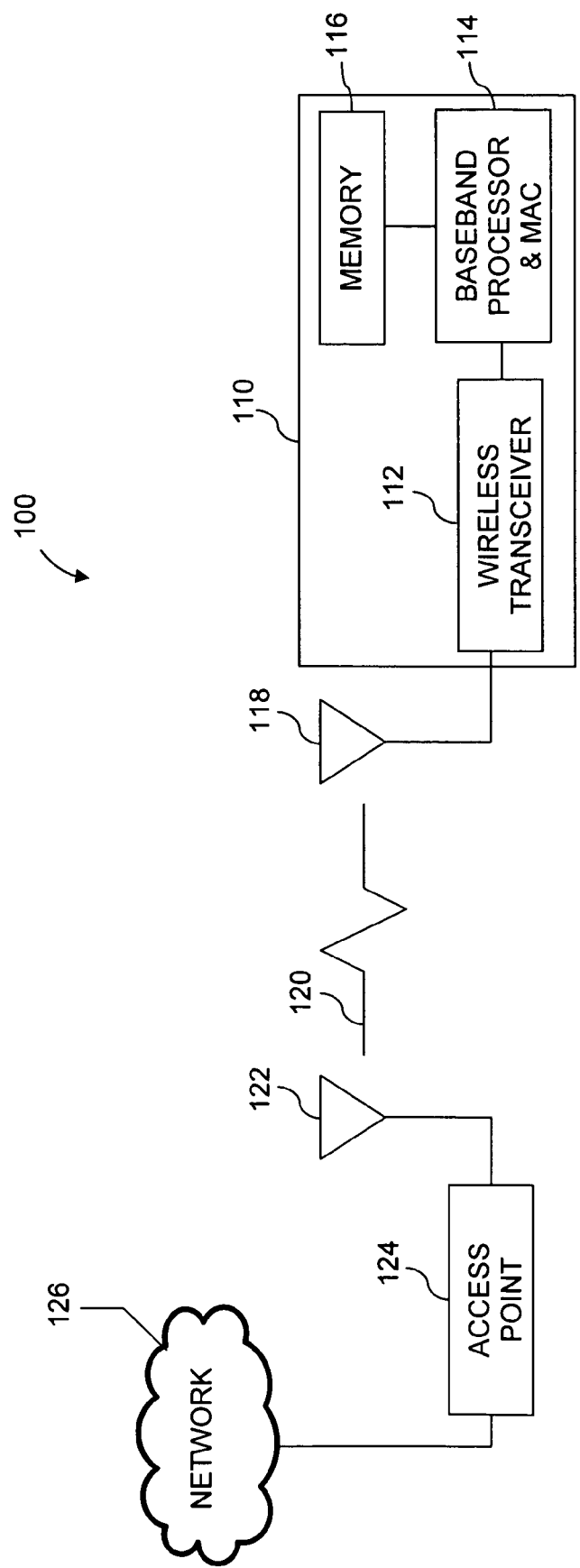
FIG. 1 is a block diagram of a wireless local area network system in accordance with one embodiment of the present invention.

Referring now to FIG. 1, a wireless communication system in accordance with one embodiment of the present invention will be discussed. In the communications system 100 shown in FIG. 1, a user station 110 may include a wireless transceiver 112 to couple to an antenna 118 and to a processor 114. Processor 114 in one embodiment may comprise a single processor, or alternatively may comprise a baseband processor and an applications processor, although the scope of the invention is not limited in this respect. Processor 114 may couple to a memory 116 which may include volatile memory such as DRAM, non-volatile memory such as flash memory, or alternatively may include other types of storage such as a hard disk drive, polymer memory, or magnetic memory, although the scope of the invention is not limited in this respect. Some portion or all of memory 116 may be included on the same integrated circuit as processor 114, or alternatively some portion or all of memory 116 may be disposed on an integrated circuit or other medium, for example a hard disk drive, that is external to the integrated circuit of processor 114, although the scope of the invention is not limited in this respect.

User station 110 may communicate with access point 124 via wireless communication link 120, where access point 124, and optionally user station 110, may include at least one antenna 122 or may include multiple antennas in an alternative embodiment, for example in a spatial division multiple access (SDMA) system, multiple input, multiple output (MIMO) system, and so on, although the scope of the invention is not limited in this respect. In an alternative embodiment, access point 124 may be a base station or a Node B of a wireless cellular telecommunications system, although the scope of the invention is not limited in this respect. Access point 124 may couple with network 126 so that user station 110 may communicate with network 126, including devices coupled to network 126, by communicating with access point 124 via wireless communication link 120. Network 126 may include a public network such as a telephone network or the Internet, or alternatively network 126 may include a private network such as an intranet, or a combination of a public and a private network, although the scope of the invention is not limited in this respect. Communication between user station 110 and access point 128 may be implemented via a wireless local area network (WLAN), for example a network compliant with a an Institute of Electrical and Electronics Engineers (IEEE) standard such as IEEE 802.11a, IEEE 802.11b, IEEE 802.16, and so on, although the scope of the invention is not limited in this respect. In another embodiment, communication between user station 110 and access point 124 may be implemented via a cellular communication network compliant with a Third Generation Partnership Project (3GPP) standard, although the scope of the invention is not limited in this respect.

Referring now to FIG. 2, a table of a method for transferring information between an access point and a user station in accordance with one embodiment of the invention. In one embodiment of the invention, two parties or devices may establish communications with one anther in accordance with an IEEE 802.11 standard, which in one particular embodiment may be in accordance with an IEEE 802.11i standard, although the scope of the invention is not limited in this respect. For reference purposes herein, A may refer to access point 124 and S may refer to user station 110, although the scope of the invention is not limited in this respect. As shown in FIG. 2, during a probe response in which access point 124 may respond to a probe from user station 110, access point 124 may transmit a nonce, ANONCE, to user station 110 (AP →STA). In one embodiment of the invention, a nonce may be a value that is used in conjunction with a key and which may be utilized in rekeying. In one embodiment of the invention, a nonce may be used at most once, although the scope of the invention is not limited in this respect. In one embodiment of the invention, nonces may be random or pseudo-random values. As shown in FIG. 2, ANONCE may refer to the nonce of access point 124. In reply to the probe response, user station 110 may transmit the ANONCE and the nonce of the user station 110, SNONCE, back to access point 124, along with a first message integrity code (MIC1) in a process called a reassociate request (STA→AP). SNONCE may be random or pseudo-random as well. In response to a reassociate request received from user station 110, access point 124 may transmit the nonce of the user station 110, SNONCE, back to user station 110, along with a second message integrity code (MIC2) (AP→STA). The message integrity codes, MIC1 and MIC2, may be utilized to sign messages over an IEEE 802.11 channel, and may include HMAC-SHA-1, AES-CBC-MAC, and PMAC, or any other cryptographically secure message integrity code, although the scope of the invention is not limited in this respect.

In accordance with one embodiment of the invention, user station 110 and access point 124 may share a symmetric key called a pairwise master key (PMK) to control access to the channel between them. In accordance with one embodiment of the invention, the pairwise master key may be derived from a password, or alternatively may be dynamically assigned, although the scope of the invention is not limited in this respect. In one embodiment of the invention, the pairwise master key may be distributed in a secure manner and thus may be unknown to possible adversaries, although the scope of the invention is not limited in this respect. Furthermore, as shown in FIG. 2, the security protocols implemented in accordance with the present invention may be implemented using a sequence of three control messages, although the scope of the invention is not limited in this respect. In addition, such a sequence of control messages may be initiated by any one of two or more nodes communicating with one another, typically in a first node to a second node, the second node to the first node, and then again from the first to the second node, although the scope of the invention is not limited in this respect.

Referring now to FIG. 3, a diagram of a nonce information element for a probe response in accordance with one embodiment of the invention will be discussed. Nonce information element 300 may be transmitted by access point 124 for a rekeying event. In one embodiment of the invention, nonce information element 300 may be ANONCE as shown in FIG. 2, and may be a pseudo-random value. By specifying ANONCE in a probe response, a third reassociation message beyond a reassociation quest message and a reassociation response message may not be required. In one embodiment of the invention, ANONCE may be cached by access point 124 to verify a reassociate request from user station 110 as discussed, below. The nonce information element 300 may utilized to specify a nonce, and may be supported by access points 124 and user stations 110 that implement pairwise master key (PMK) based authenticated key exchange (AKE). Nonce information element 300 may comprise an Element ID of one octet, a Length indicator of one octet, and a Nonce value of 32 octets or 256 bits. In one embodiment of the invention, nonce 300 may be a pseudo-random value that is different for every Probe Response.

Referring now to FIG. 4, a diagram of a pairwise master key request information element for a reassociate request in accordance with one embodiment of the invention will be discussed. PMK request information element 400 may be transmitted from user station 110 to access point 124 and may include ANONCE, SNONCE, and MIC1 as shown in FIG. 2. The MIC1 value binds ANONCE and SNONCE together, so the respective challenges ANONCE from the Probe Response and SNONCE in the Reassociate request are not independent. PMK request information element 400 may comprise an Element ID of one octet, a Length indicator of one octet, a Key ID of 8 octets, an ANONCE of 32 octets, an SNONCE of 32 octets, and a MIC of 16 octets, although the scope of the invention is not limited in this respect. Key ID may be the name of PMK request element 400. SNONCE may be a pseudo-random value generated by user station 110. MIC of PMK request information element 400 may correspond to MIC1 of FIG. 2 and may be computed using a derived key confirmation key (KCK), ANONCE, and SNONCE as follows:

$$MIC(KCK, ANONCE\|SNONCE) \rightarrow MIC1$$

where $\|$ denotes a concatenation. The key confirmation key may be derived as follows:

$$PRF(PMK, BSSIDAP\|MAC\text{-}ADDRSTA)$$
$$\rightarrow KCK\|KEK\|TK$$

where PMK is the pairwise master key, BSSIDAP is the media access control (MAC) address of access point 124, MAC-ADDRSTA is the MAC address of user station 110, and the derived keys are the key confirmation key (KCK), key encryption key (KEK), and temporal key (TK), which is a temporal, or operational, key. PRF denotes a pseudo-random function, which may be any pseudo-random function. During a reassociate request, user station 110 may reproduce the nonce value ANONCE from a recent probe response received from access point 124 as illustrated in FIG. 2, although the scope of the invention is not limited in this respect.

In one embodiment of the invention, MIC value MIC1 may explicitly protect neither BSSIDAP nor MAC-ADDRSTA since they are utilized to compute the PTK and thus are implicitly protected by MIC1, although the scope of the invention is not limited in this respect. The unpredictability of ANONCE may assure access point 124 that the derived keys are fresh. The derivation may bind BSSIDAP and MAC-ADDRSTA to the PTK, thereby asserting they are the only addresses that may be used with these keys, although the scope of the invention is not limited in this respect.

Referring now to FIG. 5, a PMK response element of a reassociate response in accordance with one embodiment of the invention will be discussed. PMK response element 500 may be transmitted from access point 124 to user station 110 in a reassociate response as shown in FIG. 2. PMK response element 500 may comprise an Element ID of one octet, a Length indicator of one octet, a Key ID of eight octets, a group transient key (GTK) Length of one octet, a Wrapped GTK of GTK Length octets, an RSC of 6 octets, a group nonce (GNONCE) of 32 octets, and a MIC of 16 octets. Length indicator may be 65+n where n is the value of GTK Length field, and where Length indicator is the number of octets in PMK information element 500. Key ID is the name of PMK response element 500 for reassociation. MIC2 may be derived from:

$$MIC(KEK, RSN\text{-}IEAP\|PMK\text{-}RESP\text{-}IE)$$

where KEK may be derived as in a reassociate request discussed with respect to FIG. 4, RSN-IEAP is the probe response nonce information element 300 of access point 124, and PMK-RESP-IE is PMK response information element 400 of user station 110. In one embodiment of the invention, user station 110 may provide a random valued SNONCE to provide a valid MIC2 value that may allow user station 110 to conclude the reassociate response received from access point 124 as shown in FIG. 2 is a live value and not a replay. As a result, the correct KCK is derived from the PMK so that to produce a valid MIC2, thereby allowing access point 124 to be authenticated to user station 110, although the scope of the invention is not limited in this respect.

Referring now to FIG. 6, a flow diagram of a method for an authenticated key exchange in a wireless local area network system in accordance with one embodiment of the invention will be discussed. As shown in FIG. 6, method 600 may represent a pairwise master key (PMK) based authenticated key exchange (AKE) between user station 110 and access point 124 of FIG. 1 as illustrated in FIG. 2 and as discussed herein, although the scope of the invention is not limited in this respect. User station 110 may transmit a probe request as a challenge to access point 124 at block 610. Access point 124, after receiving the probe request, may transmit its nonce information element 300, ANONCE, at block 612, as a probe response to the probe request. At block 614, after receiving the probe response, user station 110 may generate a PMK information element 400 base on ANONCE, its own nonce, SNONCE, and on a first message integrity code, MIC1. User station 110 may then request rekeying in a reassociate request by transmitting PMK information element 400 to access point 124 at block 616. Access point 124 may then generate a PMK response information element 500 based on the nonce of the user station 110, SNONCE, and based on a second message integrity code, MIC2 at block 618. Access point 124 may determine whether the reassociate request received from user station 110 is valid at block 620. In the event the reassociate request is not valid, the reassociate request may be discarded at block 628. Otherwise, if the reassociate request is valid, access point 124 may transmit the PMK response information element 500 to user station 110 as a reassociation response at block 622. User station 110 may determine whether the reassociation response is valid at block 624, and if not valid then the response may be discarded at block 628. Otherwise, if the reassociation response is valid, user station 110 may communicate with access point 124 at block 626, although the scope of the invention is not limited in this respect.

Although the invention has been described with a certain degree of particularity, it should be recognized that elements thereof may be altered by persons skilled in the art without departing from the spirit and scope of the invention. It is believed that the authenticated key exchange based on a pairwise master key of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof, and further without providing substantial change thereto. It is the intention of the claims to encompass and include such changes.

What is claimed is:

1. A method, comprising:
receiving, by an access point (AP) after distribution of a pairwise master key, a probe request;
transmitting, by the AP, in response to the probe request, a probe response including an AP nonce generated by the AP; and
receiving, by the AP, a pairwise master key request information element as a reassociate request from a user station that received the transmitted AP nonce, the pairwise master key request information element including the AP nonce, a user station nonce, and a message integrity code, wherein the message integrity code was computed using a message integrity code algorithm with a key confirmation key, the AP nonce, and the user station nonce, and wherein the key confirmation key was computed using a psuedo-random function algorithm with the pairwise master key, a media access control address of the AP, and a media access control address of the user station.

2. A method as claimed in claim 1, further comprising:
generating, by the AP, a pairwise master key response element based on the user station nonce and an additional message integrity code, the additional message integrity code being computed using the message integrity code algorithm with a key encryption key, the probe response, and the pairwise master key request information element, and wherein the key encryption key is computed using the psuedo random function algorithm with the pairwise master key, the media access control address of the AP, and the media access control address of the user station; and
transmitting, by the AP, the pairwise master response element as a reassociation response.

3. A method as claimed in claim 2, further comprising communicating, by the AP, with the user station after the user station receives the reassociation response.

4. A method, comprising:
transmitting, by a user station after distribution of a pairwise master key, a probe request to an access point (AP);
receiving, by the user station, a probe response including an AP nonce generated by the AP;
transmitting, by the user station, a pairwise master key request information element as a reassociate request to the AP, the pairwise master key request information element including the AP nonce, a user station nonce, and a message integrity code, wherein the message integrity code is computed using a message integrity code algorithm with a key confirmation key, the AP nonce, and the user station nonce, and wherein the key confirmation key is computed using a psuedo random function algorithm with the pairwise master key, a media access control address of the AP, and a media access control address of the user station.

5. A method as claimed in claim 4, further comprising:
receiving, by the user station, a pairwise master key response element from the AP, wherein the pairwise master key response element is transmitted by the AP as a reassociation response and is based on the user station nonce and an additional message integrity code, the additional message integrity code being computed using the message integrity code algorithm with a key encryption key, the probe response, and the pairwise master key request information element, and wherein the key was computed using the psuedo random function algorithm with the pairwise master key, the media access control address of the AP, and the media access control address of the user station.

6. A method as claimed in claim 5, further comprising communicating, by the user station, with the AP after receiving the reassociation response.

7. An article of manufacture comprising a computer readable storage medium having stored thereon instructions that, when executed by a computer platform, result in an authenticated key exchange, by:
receiving, by an access point (AP) after distribution of a pairwise master key, a probe request;
transmitting, by the AP in response to the probe request, a probe response including an AP nonce generated by the AP; and
receiving, by the AP, a pairwise master key request information element as a reassociate request from a user station that received the transmitted AP nonce, the pairwise master key request information element including the AP nonce, a user station nonce, and a message integrity code, wherein the message integrity code was computed using a message integrity code algorithm with a key confirmation key, the AP nonce, and the user station nonce, and wherein the key confirmation key was computed using a pseudo random function algorithm with the pairwise master key, a media access control address of the AP, and a media access control address of the user station.

8. An article as claimed in claim 7, wherein the instructions, when executed, further result in an authenticated key exchange by:
generating, by the AP, a pairwise master key response element based on the user station nonce and an additional message integrity code, the additional message integrity code being computed using the message integrity code algorithm with a key encryption key, the probe response, and the pairwise master key request information element, and wherein the key encryption key is computed using the psuedo random function algorithm with the pairwise master key, the media access control address of the AP, and the media access control address of the user station; and
transmitting, by the AP, the pairwise master response element as a reassociation response.

9. An article as claimed in claim 8, wherein the instructions, when executed, further result in an authenticated key exchange by communicating, by the AP, with the user station after the user station receives the reassociation response.

10. An article of manufacture comprising a computer readable storage medium having stored thereon instructions that, when executed by a computer platform, result in an authenticated key exchange, by:
transmitting, by an access point (AP) after distribution of a pairwise master key, a probe request;
receiving, by the user station in response to the probe request, a probe response including an AP nonce generated by the AP;
transmitting, by the user station, a pairwise master key request information element as a reassociate request, the pairwise master key request information element including the AP nonce, a user station nonce, and a message integrity code, wherein the message integrity code was computed using a message integrity code algorithm with a key confirmation key, the AP nonce, and the user station nonce, and wherein the key confirmation key was computed using a pseudo random function algorithm with the pairwise master key, a media access control address of the AP, and a media access control address of the user station.

11. An article as claimed in claim 10, wherein the instructions, when executed, further result in an authenticated key exchange by receiving, by the user station, a pairwise master key response element from the AP, wherein the pairwise master key response element is transmitted by the AP as a reassociation response and is based on the user station nonce and an additional message integrity code, the additional message integrity code being computed using the message integrity code algorithm with a key encryption key, the probe response, and the pairwise master key request information element, and wherein the key encryption key is computed using the pseudo random function algorithm with the pairwise master key, the media access control address of the AP, and the media access control address of the user station.

12. An article as claimed in claim 11, wherein the instructions, when executed, further result in an authenticated key exchange by communicating, by the user station, with the AP after receiving the reassociation response.

13. An apparatus, comprising:

an omnidirectional antenna;

a transceiver coupled to said omnidirectional antenna; and a baseband processor to:

generate a probe request to be transmitted to an access point (AP), and to receive a probe response including an AP nonce generated by the AP; and generate a pairwise master key request information element including the AP nonce, a user station nonce, and a message integrity code, the message integrity code being computed using a message integrity code algorithm with a key confirmation key, the AP nonce, and the user station nonce, and wherein the key confirmation key is computed using a psuedo random function algorithm with the pairwise master key, a media access control address of the AP, and a media access control address of the user station.

14. An apparatus as claimed in claim 13, said baseband processor to receive a pairwise master key response element from the AP, wherein the pairwise master key response element is transmitted by the AP as a reassociation response and is based on the user station nonce and an additional message integrity code, the additional message integrity code being computed using the message integrity code algorithm with a key encryption key, the probe response, and the pairwise master key request information element, and wherein the key encryption key is computed using the pseudo random function algorithm with the pairwise master key, the media access control address of the AP, and the media access control address of the user station.

15. An apparatus as claimed in claim 14, said baseband processor to establish communication with the AP after receiving the reassociation response.

* * * * *